(12) United States Patent
Ishitsuka

(10) Patent No.: US 10,222,903 B2
(45) Date of Patent: Mar. 5, 2019

(54) DISPLAY CONTROL APPARATUS AND CONTROL METHOD THEREOF

(71) Applicant: CANON KABUSHIKI KAISHA, Tokyo (JP)

(72) Inventor: Yuichiro Ishitsuka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 15/399,874

(22) Filed: Jan. 6, 2017

(65) Prior Publication Data

US 2017/0199620 A1 Jul. 13, 2017

(30) Foreign Application Priority Data

Jan. 8, 2016 (JP) .................................. 2016-002997

(51) Int. Cl.
*G06F 3/041* (2006.01)
*G06F 3/0484* (2013.01)
*H04N 5/232* (2006.01)

(52) U.S. Cl.
CPC .......... *G06F 3/0416* (2013.01); *G06F 3/0412* (2013.01); *G06F 3/04845* (2013.01); *H04N 5/23216* (2013.01); *G06F 2203/04104* (2013.01)

(58) Field of Classification Search
None
See application file for complete search history.

(56) References Cited

U.S. PATENT DOCUMENTS

| 2011/0169760 A1* | 7/2011 | Largillier | G06F 3/04883 345/173 |
| 2013/0002575 A1* | 1/2013 | Endo | G06F 3/0236 345/173 |
| 2014/0006985 A1* | 1/2014 | Matsushima | G06F 3/04883 715/765 |

FOREIGN PATENT DOCUMENTS

JP 5827695 B2 12/2015
WO 2013/089012 A1 6/2013

* cited by examiner

*Primary Examiner* — Joseph R Haley
(74) *Attorney, Agent, or Firm* — Cowan, Liebowitz & Latzman, P.C.

(57) ABSTRACT

A display control apparatus, in a case where, in a state where a plurality of display objects are arranged in close proximity to each other on a display unit, a touch operation on an extended area that is adjacent to a first display area of a first display object and that is provided so as to overlap a portion of a second display area of a second display object, is detected, and a first touch operation in which a touch operation is performed at a plurality of locations is detected in the extended area, controls such that processing in the first display area that is based on the first touch operation is performed.

27 Claims, 9 Drawing Sheets

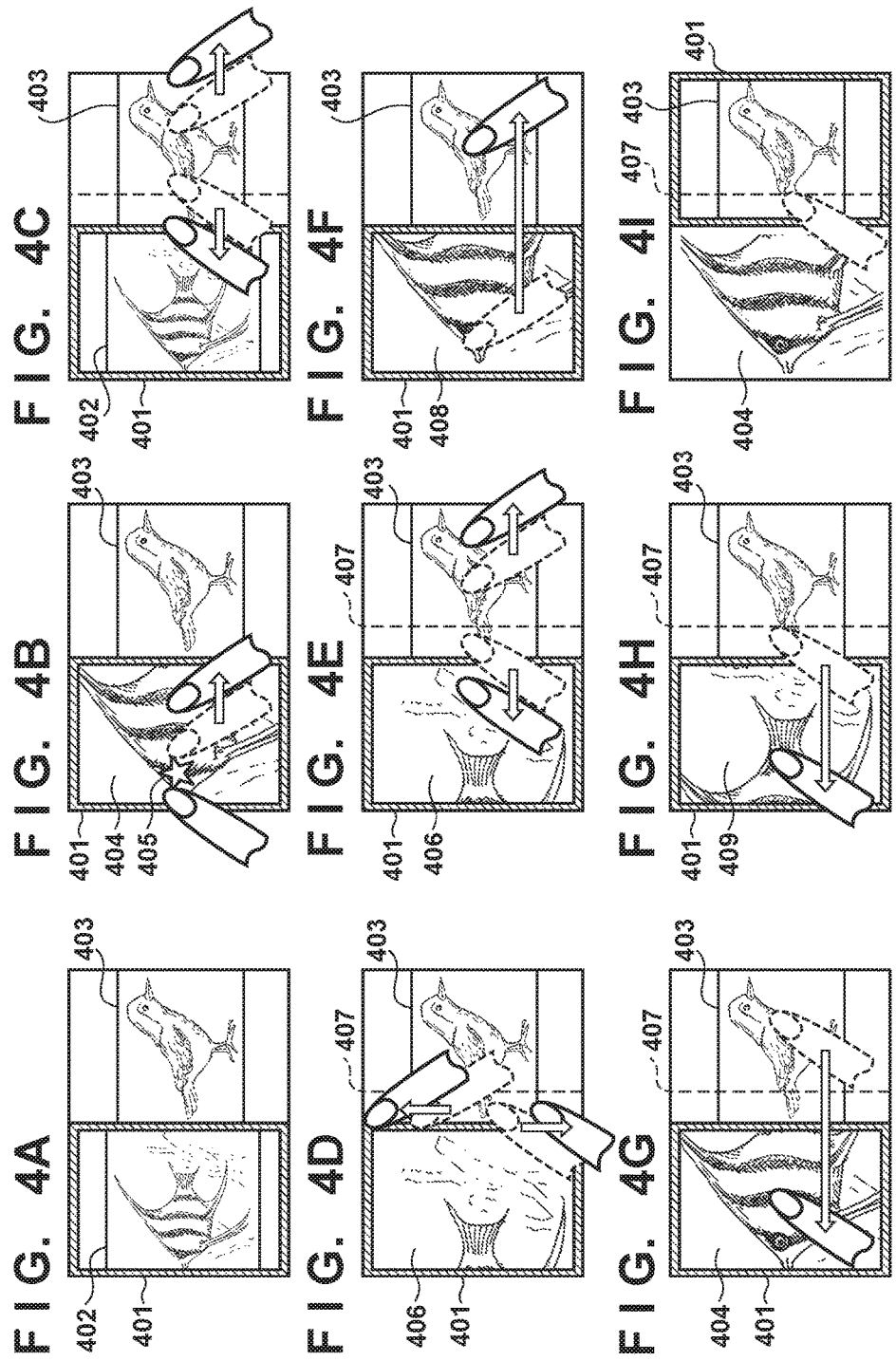

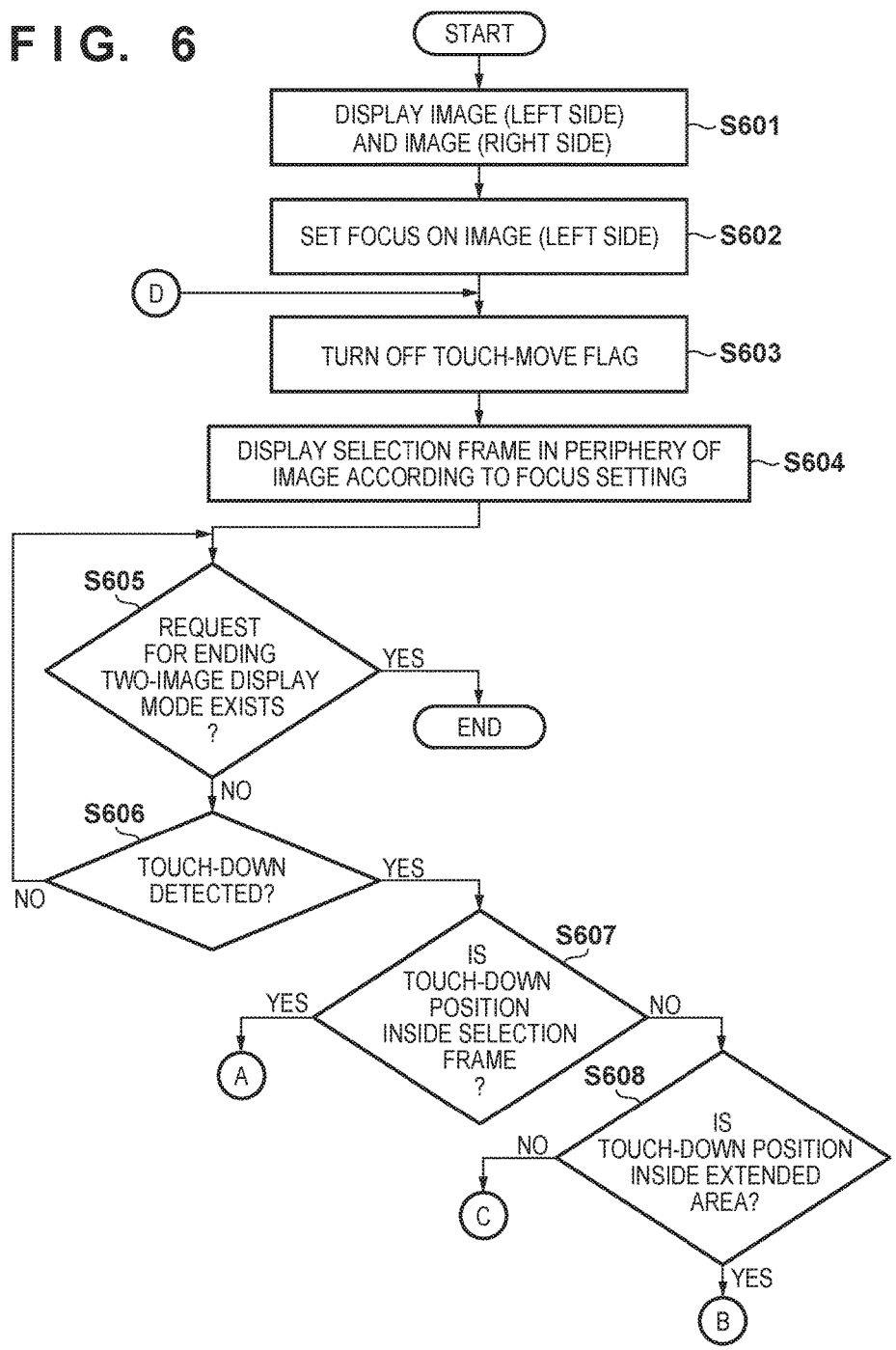

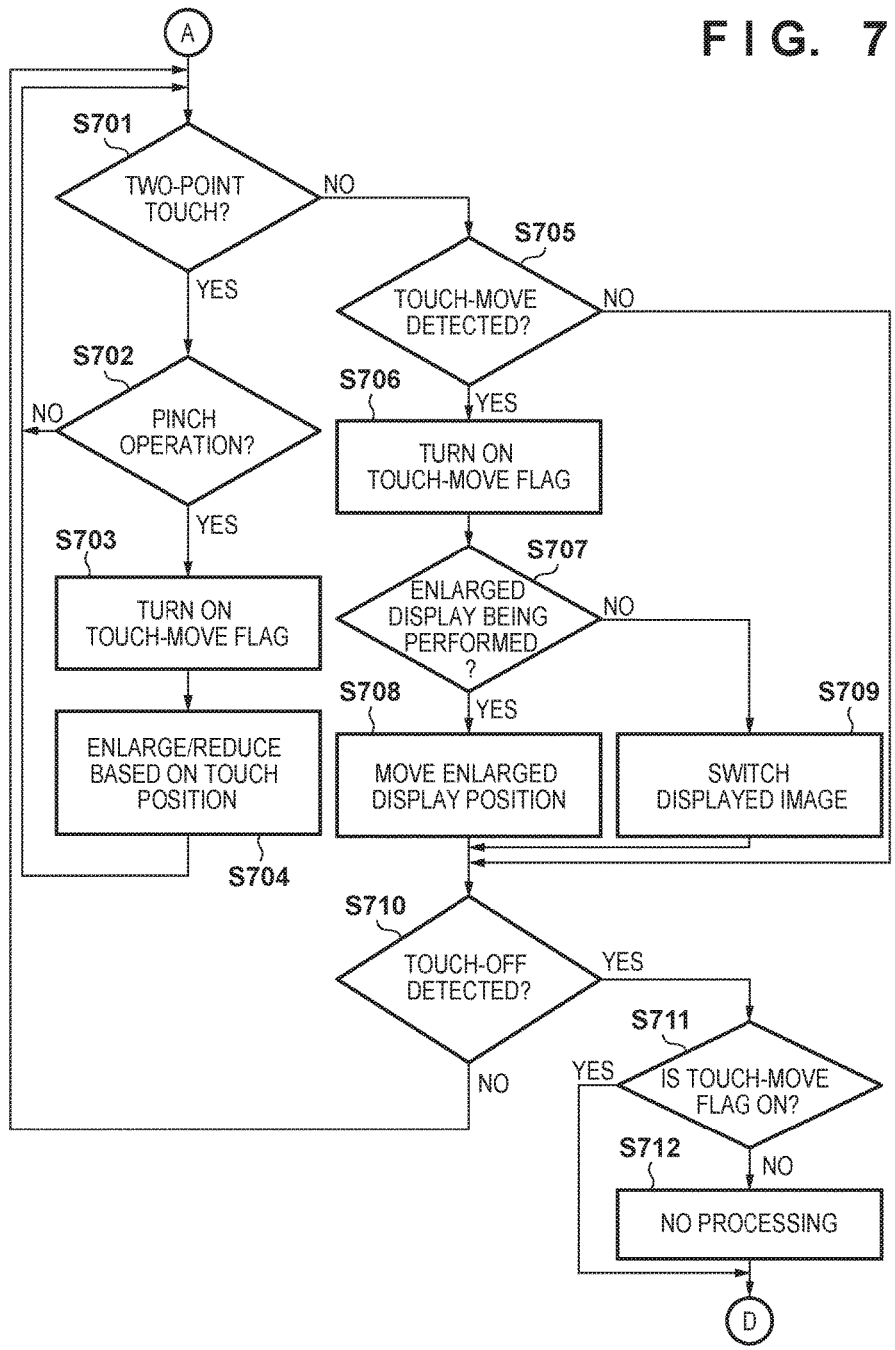

DISPLAY CONTROL APPARATUS AND CONTROL METHOD THEREOF

BACKGROUND OF THE INVENTION

Field of the Invention

The present invention relates to a display control apparatus and a display control method for displaying a plurality of display objects on one screen.

Description of the Related Art

In the case where, with a plurality of display objects (objects) being displayed on one screen, a predetermined function for a specific object is desired to be executed according to a touch operation on the screen, there are cases where the reaction region of another object arranged in close proximity is touched inadvertently, and the result desired by the user cannot be obtained.

In this regard, Japanese Patent No. 5827695 describes a technique for determining, from the relative positional relationship between the touch position and each of the reaction regions, a function for which the touch operation is enabled, in the case where the touch position overlaps the reaction regions of a plurality of objects.

However, in Japanese Patent No. 5827695, a reaction region in which a touch operation on a specific object is enabled changes in accordance with the display positions of adjacent objects. Therefore, for example, in the case of a touch near the boundary between the specific object and another object, despite an intention of touching the reaction region of the specific object, there are cases where the reaction region of the other object is enabled, and the result desired by the user cannot be obtained.

SUMMARY OF THE INVENTION

The present invention has been made in consideration of the aforementioned problems, and realizes a technique that enables a function for a specific display object to be executed preferentially in the case where a touch operation is performed near the boundary between display objects arranged in close proximity to each other.

In order to solve the aforementioned problems, the present invention provides a display control apparatus comprising: a touch detection unit configured to detect a touch operation on a display unit; and a display control unit configured to perform: in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a first touch operation in which a touch operation is performed at a plurality of locations is detected in the extended area, control such that processing in the first display area that is based on the first touch operation is performed, and in a case where a second touch operation other than a touch operation at a plurality of locations is detected in the extended area, control such that processing in the second display area that is based on the second touch operation is performed.

In order to solve the aforementioned problems, the present invention provides a display control apparatus comprising: a touch detection unit configured to detect a touch operation on a display unit; and a display control unit configured to perform: in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a specific touch operation accompanied by movement of a touch position is detected in the extended area, control such that processing in the first display area that is based on the specific touch operation is performed, and in a case where a second touch operation not accompanied by movement of a touch position is detected in the extended area, control such that processing in the second display area that is based on the second touch operation is performed.

In order to solve the aforementioned problems, the present invention provides a control method of a display control apparatus comprising: detecting a touch operation on a display unit; performing, in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a first touch operation in which a touch operation is performed at a plurality of locations is detected in the extended area, control such that processing in the first display area that is based on the first touch operation is performed; and performing, in a case where a second touch operation other than a touch operation at a plurality of locations is detected in the extended area, control such that processing in the second display area that is based on the second touch operation is performed.

In order to solve the aforementioned problems, the present invention provides a control method of a display control apparatus comprising: detecting a touch operation on a display unit; performing, in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a specific touch operation accompanied by movement of a touch position is detected in the extended area, control such that processing in the first display area that is based on the specific touch operation is performed; and performing, in a case where a second touch operation not accompanied by movement of a touch position is detected in the extended area, control such that processing in the second display area that is based on the second touch operation is performed.

In order to solve the aforementioned problems, the present invention provides a non-transitory computer-readable storage medium storing a program for causing a computer to function as a touch detection unit and a display control unit of a display control apparatus, wherein the touch detection unit detects a touch operation on a display unit; and the display control unit performs: in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a first touch operation in which a touch operation is performed at a plurality of locations is detected in the extended area, control such that processing in the first display area that is based on the first touch operation is performed, and in a case where a second touch operation other than a touch operation at a plurality of locations is detected in the extended area, control such that processing in the second display area that is based on the second touch operation is performed.

In order to solve the aforementioned problems, the present invention provides a non-transitory computer-readable storage medium storing a program for causing a computer to function as a touch detection unit and a display control unit of a display control apparatus, wherein the touch detection unit detects a touch operation on a display unit; and the display control unit performs: in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a specific touch operation accompanied by movement of a touch position is detected in the extended area, control such that processing in the first display area that is based on the specific touch operation is performed, and in a case where a second touch operation not accompanied by movement of a touch position is detected in the extended area, control such that processing in the second display area that is based on the second touch operation is performed.

According to the present invention, a function for a specific display object can be executed preferentially in the case of performing a touch operation near the boundary between display objects arranged in close proximity to each other.

Further features of the present invention will become apparent from the following description of exemplary embodiments (with reference to the attached drawings).

BRIEF DESCRIPTION OF THE DRAWINGS

FIGS. 4A to 4I are diagrams illustrating display control that is based on a touch operation in the two-image display mode of the present embodiment.

FIG. 6 is a flowchart showing display control processing in the two-image display mode of the present embodiment.

FIG. 7 is a flowchart showing display control processing in the two-image display mode of the present embodiment.

DESCRIPTION OF THE EMBODIMENTS

Embodiments for implementing the present invention will be described below in detail. In the present embodiment, an example in which a display control apparatus is applied to a single-lens reflex digital camera as an image capturing apparatus will be described.

Apparatus Configuration

The configuration and functions of a digital camera according to the present embodiment will be described below with reference to FIGS. 1A, 1B and 2.

The external configuration of the digital camera 100 (referred to as "camera" below) according to the present embodiment will be described first with reference to FIGS. 1A and 1B.

Figure 1A:
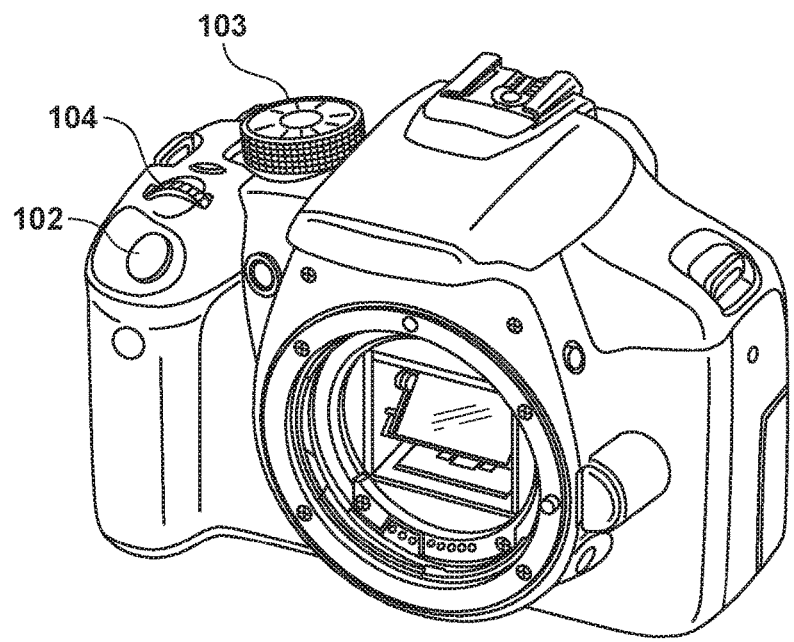
FIGS. 1A and 1B are diagrams showing an appearance of a display control apparatus according to a present embodiment.
Figure 1B:
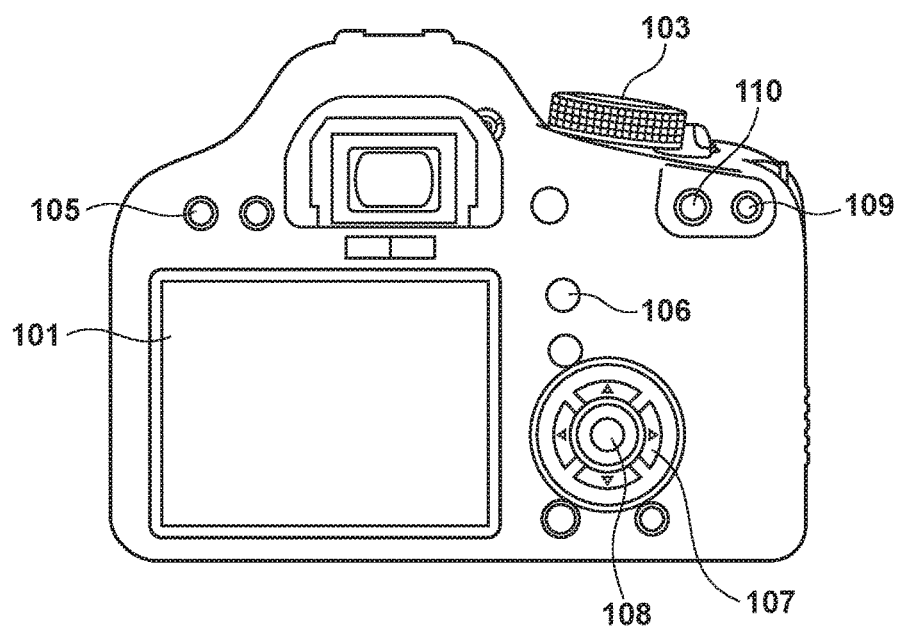

FIG. 1A is a front perspective view of the camera 100, and FIG. 1B is a back perspective view of the camera 100.

In FIGS. 1A and 1B, a display unit 101 is a display device arranged on a back surface of a camera body for displaying images and various types of information, such as an LCD. Moreover, the display unit 101 has a function of reproducing a still image after the still image was shot, a function of displaying a moving image that is being recorded, and a live view display function as well. A shutter-release button 102 is a push-button type operation member for giving a shooting instruction. A mode dial 103 is a rotating type operation member for switching between operation modes of the camera 100. A main dial 104 is a rotating operation member capable of changing setting values such as a shutter speed and a diaphragm aperture.

A menu button 105 is an operation member for displaying, on the display unit 101, a menu screen that enables various settings to be made. A shooting setting button 106 is an operation member for setting various shooting conditions in a shooting mode for shooting still images, moving images or the like. The cross key 107 is a movement instruction member capable of performing an operation in accordance with a pressed portion of the cross key 107, due to any one of up, down, left and right being pressed down. A SET button 108 is a push button, and is mainly used for determining a selection item and the like. An enlarge button 109 is an operation member for changing on/off of enlarged display in a live view, and changing the enlargement ratio of enlarged display. Also, the enlarge button 109 is an operation member for enlarging a reproduced image in a reproduction mode, and increasing the enlargement ratio. A reduce button 110 is an operation member for reducing the enlargement ratio of an enlarged reproduced image, and performing reduced display of the screen. Note that in enlarging processing and reducing processing by the enlarge button 109 and the reduce button 110, an image is always enlarged or reduced with reference to the center of the screen (image) of the display unit 101.

The camera 100 of the present embodiment has a power supply switch for the switching on/off of the power supply to the digital camera 100 and a live view button for the switching on/off of live view display. The camera 100 also has a grip portion having a shape that makes it easy to be grasped by a user's a right hand when he or she holds the camera 100.

Figure 2:
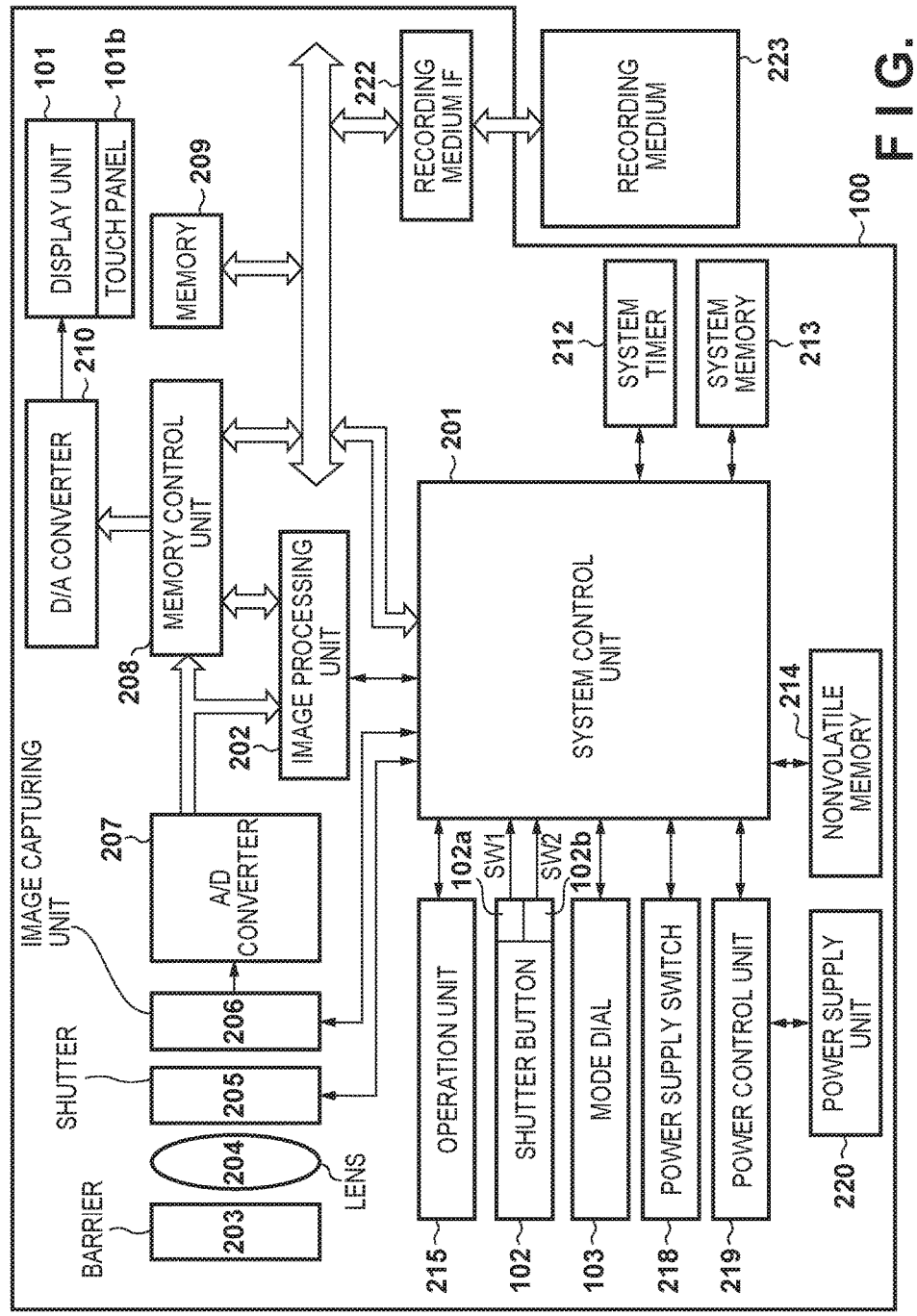
FIG. 2 is a block diagram showing a configuration of the display control apparatus according to the present embodiment.

FIG. 2 shows an internal configuration of the camera 100 according to the present embodiment.

In FIG. 2, a photographing lens 204 is a lens group that includes a zoom lens and a focusing lens. A shutter 205 has a diaphragm function. An image capturing unit 206 is an image sensor, which is constituted by a CCD, CMOS or the like, for converting the optical image of an object to an electric signal. An A/D converter 207 converts an analog signal to a digital signal. The A/D converter 207 is used to convert an analog signal, which is output from the image capturing unit 206, to a digital signal. A barrier 203 covers the image capturing system which includes the photographing lens 204 of the camera 100, thereby preventing contamination of and damage to the image capturing system that includes the photographing lens 204, a shutter 205 and image capturing unit 206. Note that the photographing lens 204 may be fixed to or detachable from the camera 100.

An image processing unit 202 performs resizing processing, such as predetermined pixel interpolation and reduction, and color conversion processing, on data from the A/D converter 207 or data from a memory control unit 208. Further, the image processing unit 202 performs predetermined calculation processing using the captured image data, and a system control unit 201 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 202 performs predetermined calculation processing using the captured image data, and AWB (Automatic White Balance) processing of TTL type is performed on the basis of the calculation results.

The output data from the A/D converter 207 is directly written into a memory 209 via both the image processing unit 202 and the memory control unit 208 or via the memory control unit 208. The memory 209 stores the image data obtained from the image capturing unit 206 and converted into digital data by the A/D converter 207, and image display data to be displayed on the display unit 101. The memory 209 has a storage capacity that is sufficient for storing a predetermined number of still images as well as moving images and audio for a predetermined time period.

The memory 209 also functions as a memory for image display (video memory). A D/A converter 210 converts the image display data stored in the memory 209 into an analog signal and supplies the display unit 101 with the analog signal. The image display data that was written into the memory 209 is displayed by the display unit 101 via the D/A converter 210. The display unit 101 performs, on a display device such as an LCD, display in accordance with the analog signal from the D/A converter 210. The digital signals once converted by the A/D converter 207 and stored in the memory 209 are converted into analog signals by the D/A converter 210, and the analog signals are successively transmitted to the display unit 101 so as to be displayed thereon, making it possible to realize an electronic view finder (EVF) functionality and to perform through the lens image display by a live view. The display unit 101 is a variable angle type display in which the user can freely change the direction and the angle of a display face of the variable angle type display relative to the camera 100, and rotate the variable angle type display.

A nonvolatile memory 214 is, for example, an EEPROM, which is electrically erasable and recordable. In the nonvolatile memory 214, constants and programs, for example, for operating the system control unit 201 are stored. In this context, "programs" may refer to programs for executing a flowchart for display control processing that will be described later.

The system control unit 201 is a calculation processing device for performing overall control of the camera 100, and realizes, by executing the programs stored in the nonvolatile memory 214, the display control processing of the present embodiment that will be described later. The system memory 213 is, for example, a RAM and used also as a work memory where constants and variables for operating the system control unit 201, and the programs read out from the nonvolatile memory 214 are expanded. The system control unit 201 controls the memory 209, the D/A converter 210, the display unit 101, and the like, so as to perform display control.

A system timer 212 is a timer circuit for measuring time periods for various types of controls and the time of an integrated clock.

The mode dial 103, a first shutter switch 102a, a second shutter switch 102b and operation units 215 are operation members for inputting various types of instructions into the system control unit 201.

The mode dial 103 switches the operation mode of the system control unit 201 to any of a still image shooting mode, a moving image recording mode, and a reproduction mode. The still image shooting mode includes an automatic shooting mode, an automatic scene determination mode, a manual mode, scene-specific shooting modes, a program AE mode, a custom mode, and the like. Using the mode dial 103, the mode is directly switched to any of the plurality of modes included in the still image shooting mode. Alternatively, it is also possible to switch, using the mode dial 103, to the still image shooting mode and then to switch, using another operation member, to any of the plurality of modes included in the still image shooting mode. Similarly, also the moving image recording mode may include a plurality of modes. Also, the reproduction mode includes a two-image display mode for arranging and displaying two images in close proximity to each other on one screen as will be described later with reference to FIGS. 3A to 3E and FIGS. 5A to 5F.

While the shutter-release button 102 provided on the camera 100 is being operated, that is, pressed half-way (the shooting preparation instruction), the first shutter switch 102a is turned on and generates a first shutter switch signal SW1. Upon receiving the first shutter switch signal SW1, the system control unit 201 causes the image processing unit 202 to start the AF (Automatic Focus) processing, the AE (Automatic Exposure) processing, the AWB (Automatic White Balance) processing, the EF (flash pre-emission) processing and the like.

When the operation of the shutter-release button 102 is completed, that is, the shutter-release button 102 is pressed fully (the shooting instruction), the second shutter switch 102b is turned on and generates a second shutter switch signal SW2. Upon receiving the second shutter switch signal SW2, the system control unit 201 starts a series of shooting processing from reading out the signal from the image capturing unit 206 to writing of image data to a recording medium 223.

By selecting various functional icons displayed on the display unit 101, appropriate functions for each situation are assigned to each operation member of the operation units 215, and the operation units 215 thus act as various function buttons. Examples of these function buttons include an end button, a back button, an image scrolling button, a jump button, a narrow-down button, an attribute change button and the like. For example, a menu screen that enables various settings to be made is displayed on the display unit 101 by pressing the menu button 105. The user can make various settings intuitively by using the menu screen, which is displayed on the display unit 101, a cross key 107 and the SET button 108.

Included among the operation units 215 is also a touch panel (touch screen) 101b that is capable of detecting a touch operation on the display unit 101. The touch panel 101b and the display unit 101 can be constructed as a single integrated unit. For example, the touch panel 101b is constructed in such a manner that the transmittance of light will not interfere with the display presented by the display unit 101, and it is attached to the uppermost layer of the display face of the display unit 101. In addition, input coordinates on the touch panel 101b and display coordinates on the display unit 101 are correlated. As a result, a GUI can be constructed that makes it possible for the user to directly manipulate the screen displayed on the display unit 101. The system control unit 201 is capable of detecting the following touch operations and conditions performed by contacting the touch panel 101b.

Touching of the touch panel 101b using a finger or pen (referred to as "touch-down" below).

A state in which the touch panel 101b is in contact with a finger or pen (referred to as "touch-on" below).

Movement of a finger or pen while in contact with the touch panel 101b (referred to as "touch-move" below).

Lifting of a finger or pen that has been in contact with the touch panel 101b (referred to as "touch-up" below).

A state in which the touch panel 101b is not being touched at all (referred to as "touch-off" below).

These operations and position coordinates at which the touch panel 101b is being touched by the finger or pen are communicated to the system control unit 201 through an internal bus, and based upon the information thus communicated, the system control unit 201 determines what kind of operation was performed on the touch panel 101b. As for "touch-move", the determination can be made also for every vertical component and horizontal component with regard to the direction of movement of the finger or pen, which is moved on the touch panel 101b, based upon a change in the coordinate position. Further, it is assumed that a stroke has been made when "touch-up" is performed following a regular "touch-move" after a "touch-down" on the touch panel 101b. A very quick stroke action is referred to as a "flick". A "flick" is an operation in which, with fingers being in contact with the touch panel 101b, the fingers are moved rapidly over a certain distance and then lifted. In other words, this is a rapid tracing operation in which the fingers are flicked across the surface of the touch panel 101b. The system control unit 201 can determine that a "flick" has been performed when it detects such movement over a predetermined distance or greater and at a predetermined speed or greater and then detects "touch-up". Further, the system control unit 201 can determine that "drag" has been performed if it detects movement over a predetermined distance or greater at a speed less than a predetermined speed. In addition, an operation of performing a quick "touch-up" on the touch panel 101b after a "touch-down" without performing a "touch-move" is referred to as a "tap". An operation of quickly performing a "tap" twice consecutively is referred to as a "double tap". Moreover, an operation of narrowing the distance between two points in a state where the touch panel 101b is touched with fingers or pens at two positions (two points) at the same time is referred to as "pinch-in". Specifically, pinch-in is an operation of bringing the fingers close to each other while the touch panel 101b is touched with these fingers at two points (an operation of narrowing the distance between a plurality of touch positions). In other words, pinch-in is an operation of moving two fingers across the touch panel 101b as if pinching an object such as an image displayed on the touch panel 101b. In contrast to pinch-in, an operation of widening the distance between two points in a state where the touch panel 101b is touched with fingers or pens at the two points (an operation of widening the distance between a plurality of touch positions) at the same time is referred to as pinch-out. The touch panel 101b may employ a method that relies upon any of the following: resistive film, electrostatic capacitance, surface acoustic waves, infrared radiation, electromagnetic induction, image recognition and optical sensing.

A power control unit 219 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 219 controls the DC-DC converter in accordance with the detection results and an instruction of the system control unit 201, and supplies a necessary voltage for a necessary length of time to each of the units including the recording medium 223.

A power supply unit 220 comprises a primary battery such as an alkaline battery or a lithium battery, a secondary battery such as an NiCd battery, an NiMH battery, or an Li-ion battery, or an AC adaptor. A recording medium interface (I/F) 222 is for interfacing with the recording medium 223 such as a memory card or a hard disk. The recording medium 223 is a recording medium such as a memory card for recording shot images, and constituted by a semiconductor memory, a magnetic disk, or the like.

In addition, the camera 100 of the present embodiment has a communication unit that transmits/receives video and sound to/from an external device communicably connected via a wireless antenna or wired cable. A personal computer, a tablet terminal, which is a kind of a personal computer, a printer, another digital camera, a smart phone, which is a kind of a mobile telephone terminal, various service providing servers, and the like are assumed as the external device.

Note that the hardware configuration is not limited to that shown in FIG. 2, and a configuration is also possible in which, for example, a single item of hardware performs display control, communication control, shooting control, image processing control, and the like, so as to function as each unit or block of the camera 100. Alternatively, it is also possible that a plurality of items of hardware operate in cooperation with each other to function as a single unit or block.

Display Control Processing

Next, display control operations of the camera 100 of the present embodiment will be described with reference to FIGS. 3A to 9. Note that an object (display object) in the present embodiment is an image. Also, for the purpose of simplifying the description, an example will be described below in which the number of images as display objects is two, and two images are displayed so as to be arranged horizontally, but the number of objects may be more than two, and images may be arranged vertically.

Display Control Operations in Accordance with the Type of Touch Operation

Figure 3A:
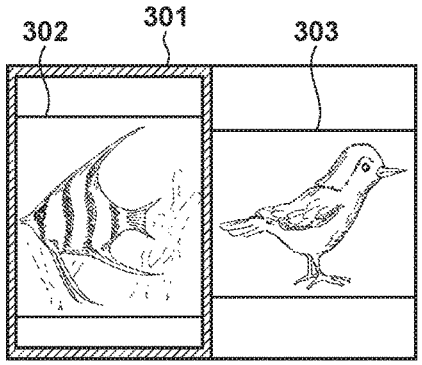
FIGS. 3A to 3E are diagrams illustrating a two-image display mode of the present embodiment.

FIGS. 3A to 3E show a display example in a two-image display mode for displaying two images on a display screen of the display unit 101. FIG. 3A shows a state in which two images 302 and 303 are arranged in close proximity to each other and displayed on the display unit 101, and each image is displayed in its entirety. In FIG. 3A, a selection frame 301 is added in the periphery of the display area of the image 302, and thereby the user can recognize that the focus is set on the image 302 that is to be subjected to processing that is based on a touch operation. In the present embodiment, as will be described later with reference to FIGS. 4A to 4I and FIGS. 5A to 5F, regardless of the type of touch operation (tap, pinch, drag, flick or the like), in the case where a touch on the image 302 to be processed is detected, processing on the image 303 that is not to be processed is not executed. In other words, if a touch on the image 303 that is not to be processed is detected, processing on the image 303 that is not to be processed is not executed.

Figure 3B:
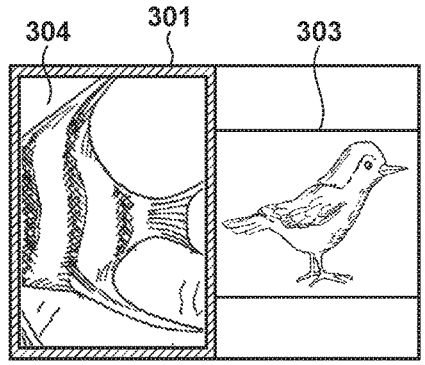

FIG. 3B shows a state in which an image 304 obtained by enlarging the image 302 from the display state in FIG. 3A is displayed. Enlarged display can be performed by using the enlarge button 109 or performing a touch operation such as pinch-out on the display unit 101 (the touch panel 101b). However, in enlarging processing that uses the enlarge button 109, enlarged display is always performed with reference to the center of the screen (image). Note that the display format of the image 303 that is not to be processed does not change.

Figure 3C:
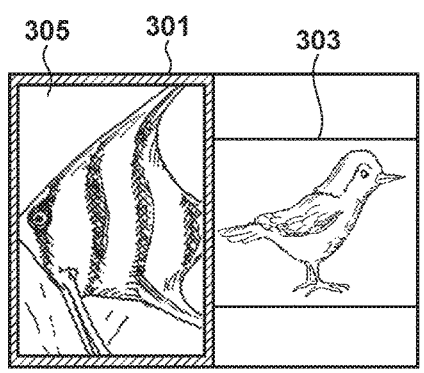

FIG. 3C shows a state in which the display position of the image 304 during enlarged display is moved as an image 305 from the display state in FIG. 3B. The display position can be moved by using the cross key 107 or by performing a touch operation such as drag on the display unit 101 (the touch panel 101b). The display format of the image 303 that is not to be processed does not change.

Figure 3D:
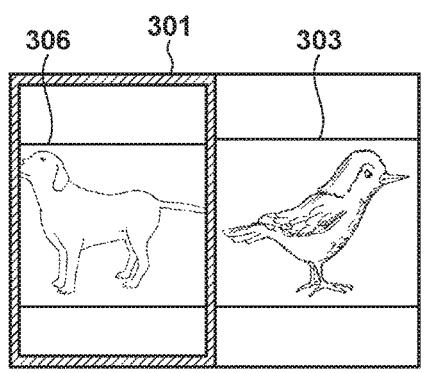

FIG. 3D shows a state in which the image 302 to be processed is switched with another image 306 from the display state in FIG. 3A. Images can be switched by using the cross key 107 or by performing a touch operation such as a flick on the display unit 101 (the touch panel 101b). The display format of the image 303 that is not to be processed does not change.

Figure 3E:
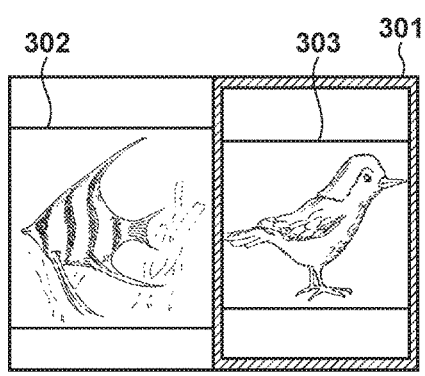

FIG. 3E shows a state in which the selection frame 301 is changed from the image 302 to the image 303 from the display state in FIG. 3A, and the image to be processed is switched to the adjacent image. The selection frame 301 can be changed by using the SET button 108 or by performing a touch operation such as a tap on the display unit 101 (the touch panel 101b). Similarly to the display examples of the image 302 in FIGS. 3A to 3D, processing such as enlarging processing, display position movement and image switching can be performed on the image 303 now serving as the image to be processed. The display format of the image 302 that is no longer to be processed does not change.

Enlargement, Reduction and Movement of Image Based on Touch Operation According to Present Embodiment FIGS. 4A to 4I show a display example that is based on a touch operation in the two-image display mode, similarly to FIGS. 3A to 3E. FIG. 4A shows a state in which two images 402 and 403 are arranged in close proximity to each other and displayed on the display unit 101, and each image is displayed in its entirety. In FIG. 4A, a selection frame 401 is added to the display area of the image 402, which indicates that the image to be processed is the image 402.

FIG. 4B shows a state in which an image 404 obtained by enlarging the image 402 by performing a pinch operation from the display state in FIG. 4A is displayed. In FIG. 4B, the image 402 is enlarged with reference to a center (center point) 405 between two touch positions at an enlargement rate that is based on the distance between the two touch positions. Moreover, the touch-down positions of the pinch operation on the display unit 101 (the touch panel 101b) are inside the selection frame 401, and thus the touch operation is enabled.

FIG. 4C shows a state in which a pinch operation is performed on the image 403 that is not to be processed, in the display state in FIG. 4A. In FIG. 4C, the touch-down positions of the pinch operation on the display unit 101 (the touch panel 101b) are outside of the selection frame 401 (the display area of the image 403 that is not to be processed), and thus the touch operation is disabled, and no processing is executed on the image 403 (enlarged display is not performed).

FIG. 4D shows a state in which a pinch operation is performed near the boundary between the image 402 and the image 403 from the display state in FIG. 4A. In FIG. 4D, the touch-down positions of the pinch operation on the display unit 101 (the touch panel 101b) are outside of the selection frame 401, but are inside of an extended area 407 adjacent to the selection frame 401, and thus the touch operation is enabled, and an image 406 obtained by enlarging the image 402 at an enlargement rate that is based on the distance between the two touch positions is displayed. In the present embodiment, enlarged display by a pinch operation is performed with reference to the center between the two touch positions, and thus, for example, in the case where it is desired to enlarge the right edge portion of the image 402, a touch operation needs to be performed near the boundary between the image 402 and the image 403. However, if the touch operation outside of the selection frame 401 is disabled as in FIG. 4C, in the case of touching near the boundary between the image 402 and the image 403, there are cases where the image 403 is touched inadvertently despite the intention of touching the right edge portion of the image 402, and enlarged display of the image 402 as desired by the user cannot be performed. In view of this, in the present embodiment, a configuration is adopted in which the extended area 407 is provided so as to overlap a portion of the image 403 adjacent to an image 406 that is to be processed and to which the selection frame 401 is added as in FIG. 4D, and a touch operation is enabled as long as the touch position is within the extended area 407, even if the touch position is within the display area of the image 403 that is not to be processed.

FIG. 4E shows a state in which from the display state in FIG. 4A, touch-down is performed at a first point near the boundary between the image 402 and the image 403 (inside of the extended area 407) and a second point outside of the extended area 407 in the display area of the image 403 and then a pinch-out operation is performed. In FIG. 4E, the first touch-down position (first touch position) of the pinch operation on the display unit 101 (the touch panel 101b) is inside the extended area 407, and the second touch-down position (second touch position) is outside of the selection frame 401 (inside of the display area of the image 403 not to be processed) and the extended area 407. However, the first touch-down position is inside of the selection frame 401 or inside of the extended area 407, and thus the touch operation is enabled, and the image 406 obtained by enlarging the image 402 to be processed at an enlargement rate that is based on the distance between the two touch positions is displayed. Note that a configuration may be adopted in which, even if the first touch-down position is inside of the selection frame 401 or inside of the extended area 407, in the case where the second touch-down position is outside of the extended area 407, the touch operation is disabled (i.e. enlargement is not performed despite a pinch operation). Moreover, a configuration may be adopted in which, even if the second touch-down position is outside of the extended area 407, as long as the center between the two touch-down positions is inside of the extended area 407, the touch operation is enabled, and enlargement is performed in accordance with the pinch operation.

FIG. 4F shows a state in which a drag operation is performed from the display state of the enlarged image 406 in FIG. 4D. In FIG. 4F, the touch-down position of the drag operation on the display unit 101 (the touch panel 101b) is inside of the selection frame 401, whereby the touch operation is enabled, and the display position of the enlarged image 406 is moved in the direction of the drag operation. Note that in FIG. 4F, the touch position is moved to the outside of the selection frame 401 by the drag operation, but the display position of an enlarged image 408 can be moved until a touch-up is detected.

FIG. 4G shows a state in which in the display state of the enlarged image 404 in FIG. 4B, a drag operation is performed from the outside of the selection frame 401 (from the inside of the display area of the image 403 that is not to be processed) to the inside of the selection frame 401 via the extended area 407. In FIG. 4G, the touch-down position of the drag operation on the display unit 101 (the touch panel 101*b*)) is outside of the selection frame 401 and the extended area 407, and thus the touch operation is disabled, and the display position of the image 403 that is not to be processed is not changed. Moreover, no processing is executed on the image 404 to which the selection frame 401 is added.

FIG. 4H shows a state in which in the display state of the enlarged image 404 in FIG. 4B, a drag operation is performed from the outside of the selection frame 401 (from the inside of the extended area 407) to the inside of the selection frame 401. In FIG. 4H, the touch-down position of the drag operation on the display unit 101 (the touch panel 101*b*)) is outside of the selection frame 401, but the touch-down position is inside of the extended area 407, whereby the touch operation is enabled, and the display position of an enlarged image 409 is moved in the direction of the drag operation. Note that if, in the state where the display position of the image 409 to which the selection frame 401 is added is moved to the right, a drag operation is performed within the selection frame 401 in the opposite direction (to the left) as in FIG. 4H, the touch-move in a region in which the image 403 is displayed is also enabled, thus enabling one drag operation to be performed over a long distance, and allowing large movement over the length in the horizontal direction of the display area of the image 408 in FIG. 4F. However, even if a drag operation is performed to the left from the state in FIG. 4F, one touch operation allows movement corresponding to only a touch-move that can be performed to the left after a touch-down in a region in which a touch operation is enabled. In the present embodiment, a drag operation that is from the inside of the extended area 407 and is even from outside of the selection frame 401 is enabled, and thus movement greater than the width of the display area of an image to be processed is possible.

FIG. 4I shows a state in which in the display state of the enlarged image 404 in FIG. 4B, a tap operation (an operation of performing a touch-down and then a touch-up without moving) is performed outside of the selection frame 401 (inside of the extended area 407). FIG. 4I shows a case where a position at which the tap operation was performed is inside of the extended area 407, but a drag operation or pinch operation was not performed. Therefore, the tap operation is assumed to be, not an operation for the image 404 to be processed, but an operation of selecting the image 403 displayed adjacent thereto, and the selection frame 401 is moved to a region in which the image 403 is displayed, in accordance with a touch-up. Note that, when the selection frame 401 is switched to the display area of the image 403 on the right as in FIG. 4I, a new extended area will be formed so as to overlap a portion of the image 404 before being changed.

Figure 5A:
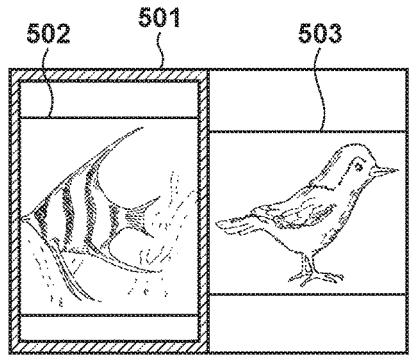
FIGS. 5A to 5F are diagrams illustrating display control that is based on a touch operation in the two-image display mode of the present embodiment.

Image Switching within Selection Frame and Selection Frame Movement Based on Touch Operation According to Present Embodiment FIGS. 5A to 5F show a display example that is based on a touch operation in the two-image display mode, similarly to FIGS. 3A to 3E and FIGS. 4A to 4I. FIG. 5A shows a state in which two images 502 and 503 are arranged in close proximity to each other and displayed on the display unit 101, and each image is displayed in its entirety. In FIG. 5A, a selection frame 501 is added to the display area of the image 502, which indicates that an image to be processed is the image 502.

Figure 5B:
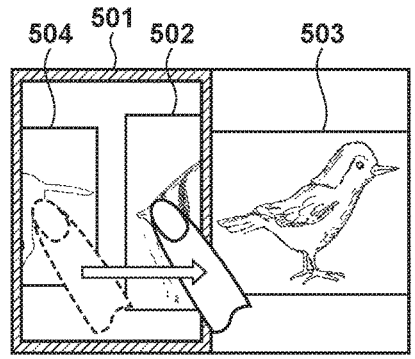

FIG. 5B shows a state in which a drag operation is performed on the image 502 from the display state in FIG. 5A. In FIG. 5B, the touch-down position of the drag operation on the display unit 101 (the touch panel 101*b*) is inside of the selection frame 501, and thus the touch operation is enabled, and the image 502 inside the selection frame is changed to an image 504 in the direction of the drag operation.

Figure 5C:
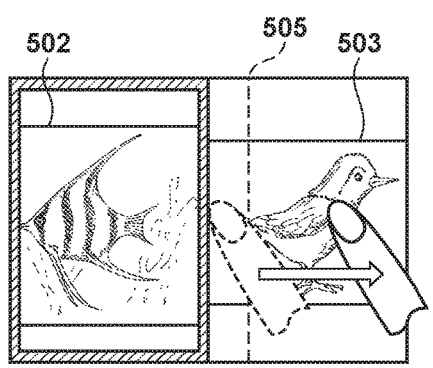
Figure 5D:
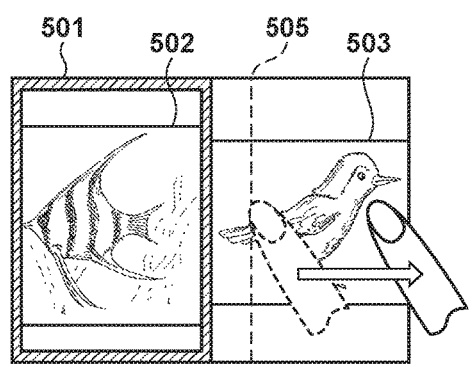

FIGS. 5C and 5D show a state in which in the display state in FIG. 5A, a drag operation is performed on the display area of the image 503 that is not to be processed. In FIGS. 5C and 5D, the touch-down position of the drag operation on the display unit 101 (the touch panel 101*b*) is outside of the selection frame 501, and the direction of the drag operation is outward of the selection frame 501, whereby the touch operation is disabled, and the image 503 is not changed to another image. In particular, in FIG. 5C, even if the touch-down position of the drag operation on the display unit 101 (the touch panel 101*b*) is inside of an extended area 505, the touch operation is disabled. This is because a movement amount of a touch-move required for changing images is sufficiently small compared to the width in the horizontal direction of the display unit 101, and thus it is not necessary to touch near the boundary between the image 502 and the image 503 (the extended area 505). Therefore, in the present embodiment, in the case where enlarged display is not performed (in the case where an entire image is displayed), whether or not the touch-down position of the drag operation on the display unit 101 (the touch panel 101*b*) is inside of the extended area 505 is not taken into consideration.

Figure 5E:
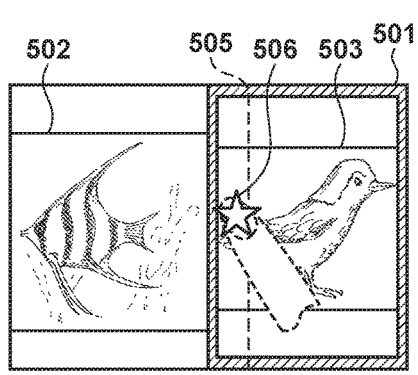
Figure 5F:
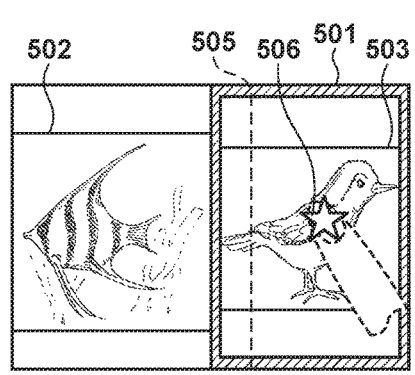

FIGS. 5E and 5F show a state in which from the display state in FIG. 5A, a tap operation is performed on the display area of the image 503. In FIGS. 5E and 5F, a touch position 506 of the tap operation on the display unit 101 (the touch panel 101*b*) is outside of the selection frame 501, and thus the touch operation is enabled, and the selection frame 501 is switched to the image 503. In FIGS. 5E and 5F, regardless of whether or not the tap position 506 is inside of the extended area 505, the touch operation is enabled. This is because a tap operation for moving the selection frame 501 may be performed at any portion in the display area of the image 503 to which the change is made, thus the region that can be touched is sufficiently wide, and it is not necessary to touch near the boundary between the image 502 and the image 503 (the extended area 505). Therefore, in the present embodiment, whether or not the tap position 506 is inside of the extended area 505 is not taken into consideration. Note that if the selection frame 501 is switched to the image 503 in FIGS. 5E and 5F, a new extended area will be formed so as to overlap a portion of the image 502 before being changed.

Display Control Flow of Present Embodiment

FIGS. 6 to 9 show display control processing that is based on a touch operation in the two-image display mode. Note that the processing of FIGS. 6 to 9 is realized by loading a program stored in the nonvolatile memory 214 to the system memory 213 and causing the system control unit 201 to execute the program. Also, the processing in FIGS. 6 to 9 is started when, in a state where the operation mode of the camera 100 is set to a reproduction mode or the like, and images are read out from the recording medium 223 and are displayed on the display unit 101, the two-image display mode is set using the mode dial 103 or the like. Note that also according to operations on various operation members included in the operation unit 215 other than a touch operation, processing such as enlargement, reduction, display range change during enlargement, selection frame movement and image switch can be performed, but description on such processing is omitted in order to simplify the description.

FIG. 6 shows the processing from when the two-image display mode is started until when the processing branches according to a touch operation.

In step S601, the system control unit 201 arranges and displays images in close proximity to each other on each of the left side and right side of the screen of the display unit 101, and the procedure advances to step S602.

In step S602, the system control unit 201 sets, by default, the left image as the image to be processed, and sets the focus on the left image by adding a selection frame (i.e., stores, in the system memory 213, information indicating that the left image is the image to be processed), and the procedure advances to step S603.

In step S603, the system control unit 201 turns off the setting of a touch-move flag held in the system memory 213, and the procedure advances to step S604.

In step S604, the system control unit 201 displays the selection frame on the image set to be processed, and the procedure advances to step S605. Immediately after the processing in FIG. 6 has started, the left image is set as the image to be processed by default, and thus the display state as in FIG. 4A is obtained.

In step S605, the system control unit 201 determines whether or not a request for ending the two-image display mode has been given via the operation unit 215 or the like. In the case where the end request has been given, the processing of this flowchart ends, and in the case where the end request has not been given, the procedure advances to step S606.

In step S606, the system control unit 201 determines whether or not a touch-down on the display unit 101 (the touch panel 101*b*) has been detected. In the case where a touch-down has been detected, the procedure advances to step S607, and in the case where a touch-down has not been detected, the procedure advances to step S605.

In step S607, the system control unit 201 determines whether or not the touch-down position detected in step S606 is inside of the selection frame. In the case where the touch-down position is inside of the selection frame, the procedure advances to step S701, and in the case where the touch-down position is not inside of the selection frame, the procedure advances to step S608.

In step S608, the system control unit 201 determines whether or not the touch-down position detected in step S606 is inside an extended area. In the case where the touch-down position is inside of the extended area, the procedure advances to step S801, and in the case where the touch-down position is not inside of the extended area, the procedure advances to step S901.

FIG. 7 shows processing that is based on the touch operation in the case where the touch-down position is inside of the selection frame in step S607 in FIG. 6.

In step S701, the system control unit 201 determines whether or not the performed touch operation is a multi-touch operation in which a touch operation is performed at a plurality of locations (two locations) on the touch panel substantially at the same time (two-point touch). In the case where the performed touch operation is not a two-point touch (that is, in the case where the performed touch operation is an operation at one touch position), the procedure advances to step S705, and in the case of a two-point touch, the procedure advances to step S702. Note that a multi-touch operation is not limited to the case where touch-down is detected at two points (two locations) at the same time, and includes the case where, in a state in which touch-down is performed at one point and a touch-up is not detected, an additional touch-down at a second point is detected.

In step S702, the system control unit 201 determines whether or not a pinch operation (pinch-out or pinch-in) has been performed. In the case where a pinch operation has been performed, the procedure advances to step S703, and in the case where a pinch operation has not been performed, the procedure returns to step S701.

In step S703, the system control unit 201 turns on the setting of the touch-move flag, and the procedure advances to step S704.

In step S704, the system control unit 201 enlarges or reduces the image, to which the selection frame is added, based on the two touch positions, and the procedure returns to step S701. Specifically, enlargement or reduction is performed with reference to the center between the two touch positions at which the pinch operation is performed (enlargement center: position at which movement in the expansion/contraction direction does not occur before or after image enlargement/reduction), at an enlargement rate that is based on the distance between the two touch positions. Accordingly, for example, the display state in FIG. 4A changes to the display state in FIG. 4B.

In step S705, the system control unit 201 determines whether or not a touch-move has been detected at one touch position. In the case where a touch-move has been detected, the procedure advances to step S706, and in the case where a touch-move has not been detected, the procedure advances to step S710.

In step S706, the system control unit 201 turns on the setting of the touch-move flag, and the procedure advances to step S707.

In step S707, the system control unit 201 determines whether or not the image that is to be processed and on which the focus is set is undergoing enlarged display. In the case where the image is undergoing enlarged display, the procedure advances to step S708, and in the case where the image is not undergoing enlarged display, the procedure advances to step S709.

In step S708, the system control unit 201 changes, in the image that is to be processed and has been enlarged in accordance with the movement amount of the touch-move detected in step S705, a range (display range) in which the image is displayed within the display area on which the focus is set (moves the display position), and the procedure advances to step S710. Accordingly, for example, the display state in FIG. 4D changes to the display state in FIG. 4F.

In step S709, the system control unit 201 switches the display image in the direction of the touch-move (FIG. 5B), and the procedure advances to step S710.

In step S710, the system control unit 201 determines whether or not a touch-off after a touch-up (a state where no point is touched) has been detected. In the case where a touch-off has not been detected (in the case where at least one location is touched), the procedure returns to step S701, and in the case where a touch-off has been detected, the procedure advances to step S711.

In step S711, the system control unit 201 determines whether or not the touch-move flag is on. In the case where the touch-move flag is on, the procedure advances to step S603, and in the case where the touch-move flag is off, the procedure advances to step S712.

In step S712, the system control unit 201 advances the procedure to step S603 without performing any processing. Note that steps S711 and S712 are not particularly necessary in the present embodiment, but are described for easy comparison with processing after the determination in step S608 (FIGS. 8 and 9).

Figure 8:
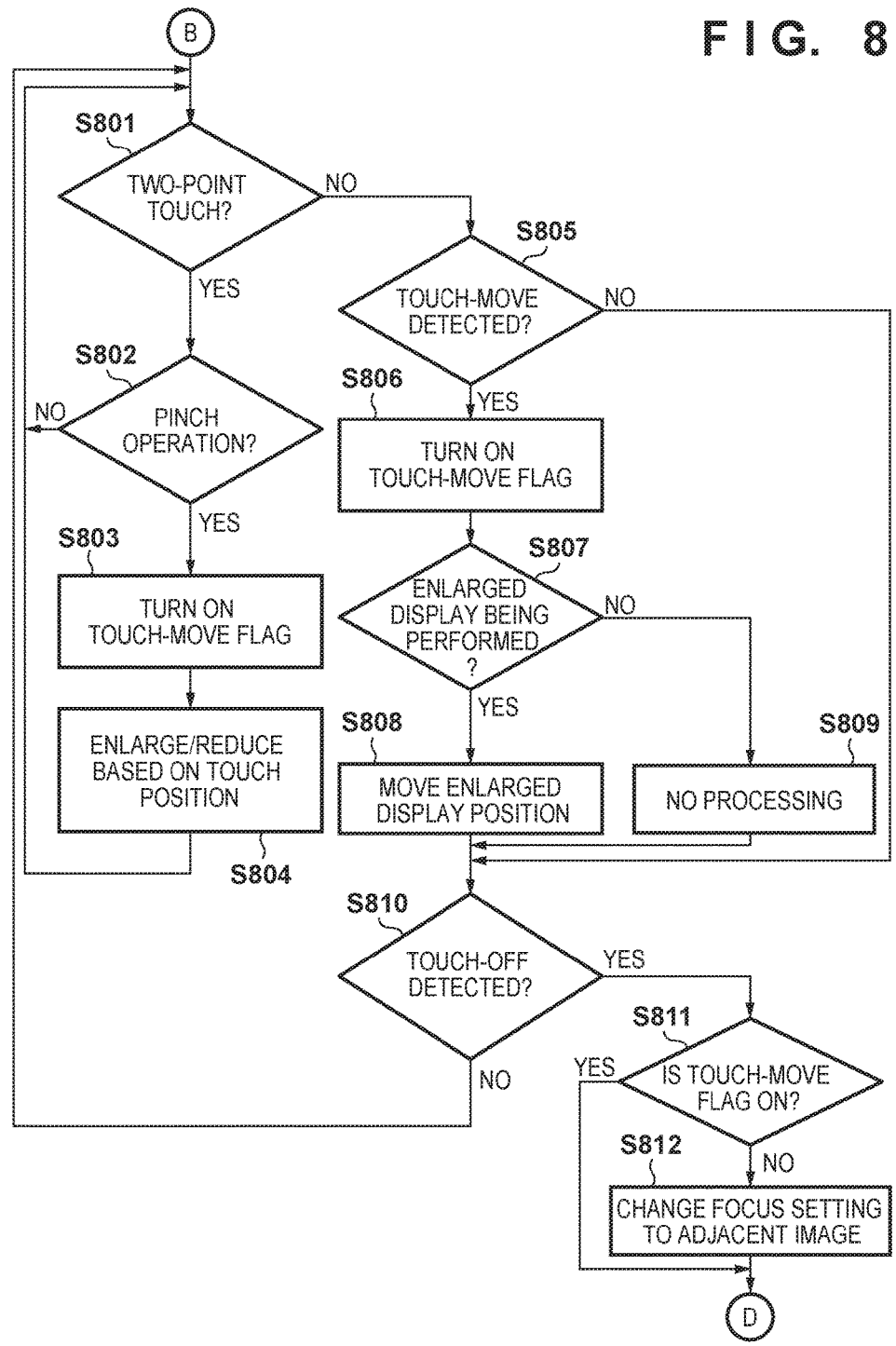
FIG. 8 is a flowchart showing display control processing in the two-image display mode of the present embodiment.
Figure 9:
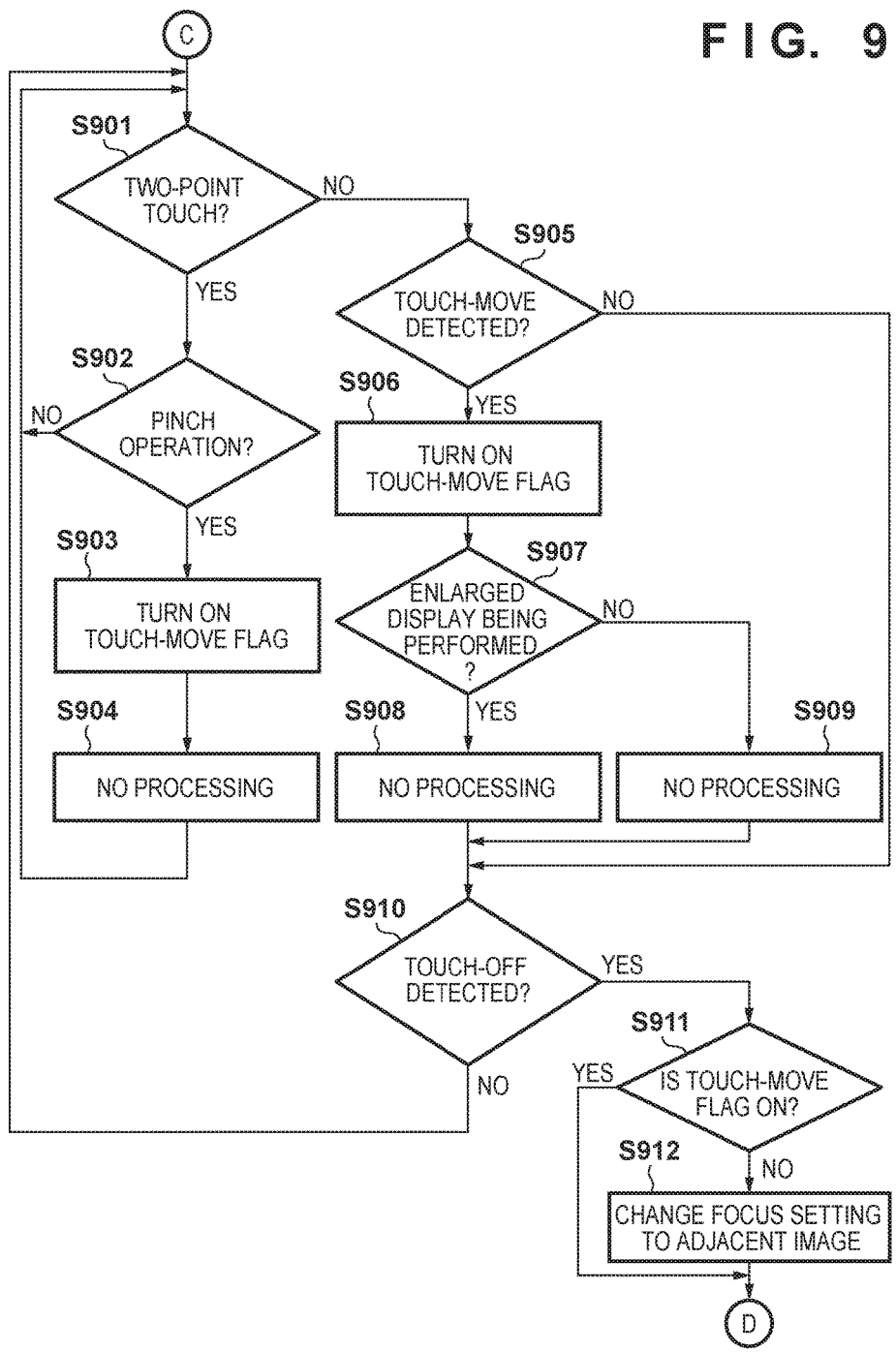
FIG. 9 is a flowchart showing display control processing in the two-image display mode of the present embodiment.

FIG. 8 shows processing that is based on a touch operation, in the case where the touch-down position is outside of the selection frame but inside of the extended area in steps S607 and S608 in FIG. 6.

In steps S801 to S803 in FIG. 8, processing similar to the processing of steps S701 to S703 in FIG. 7 is performed.

In step S804, the system control unit 201 enlarges or reduces the image, to which the selection frame is added, by performing a pinch operation (pinch-out or pinch-in). Accordingly, for example, the display state in FIG. 4A changes to the display state in FIG. 4D. In this case, the touch-down positions of the pinch operation are outside of the selection frame, but are inside of the extended area, whereby the touch operation is enabled. Accordingly, even in the case where despite user's intention to touch near an edge portion of the image to which the selection frame is added in an attempt to enlarge the image near the edge portion, a position slightly outside the selection frame is touched inadvertently, the edge portion of the image to which the selection frame is added is enlarged or reduced as desired by the user. Note that during enlarging processing or reducing processing, in the case where the center point between the two touch positions at which the pinch operation (pinch-out/pinch-in) is performed is outside of the selection frame, a reference position for enlargement/reduction (enlargement center) is set to a position inside the selection frame on the side closer to the center point between the two touch positions. Specifically, in the case where the center point between the two touch positions is within the extended area, the Y coordinate (a position in the vertical direction, namely, a direction perpendicular to a direction in which the display area of the image to which the selection frame is added and the extended area are adjacent to each other) of a reference point for enlargement/reduction is the same as that of the center point between the touch positions, and the X coordinate (a position in the horizontal direction) is the same as that of the edge portion on the side closer to the center point between the touch positions (in the example in FIG. 4D, the side of the right edge of the region 406) in the display area of the image to which the selection frame is added.

In steps S805 to S808 in FIG. 8, processing similar to the processing of steps S705 to S708 in FIG. 7 is performed. The processing of step S808 in FIG. 8 changes the display state from FIG. 4B to FIG. 4H, for example.

In step S809, the system control unit 201 advances the procedure to step S810 without performing any processing, as described with reference to FIG. 5C.

In steps S810 to S811 in FIG. 8, processing similar to the processing of steps S710 to S711 in FIG. 7 is performed.

In step S812, as described with reference to FIG. 4I and FIG. 5E, the system control unit 201 switches the image to be processed to the touched image, changes focus setting and adds the selection frame to the image after being switched, and the procedure advances to step S603.

FIG. 9 shows processing that is based on a touch operation in the case where the touch-down position is outside of the selection frame in steps S607 and is outside of the extended area in S608.

In steps S901 to S903 in FIG. 9, processing similar to the processing of steps S801 to S803 in FIG. 8 is performed.

In step S904, the system control unit 201 returns the procedure to step S901 without performing any processing, as described with reference to FIG. 4C.

In steps S905 to S907 in FIG. 9, processing similar to the processing of steps S805 to S807 in FIG. 8 is performed.

In step S908, as described with reference to FIG. 4G, and in step S909, as described with reference to FIG. 5D, the system control unit 201 advances the procedure to step S910 without performing any processing.

In steps S910 to S912 in FIG. 9, processing similar to the processing of steps S810 to S812 in FIG. 8 is performed.

As described above, according to the present embodiment, it becomes possible to preferentially execute a function for an image to be processed in a case where a touch operation is performed near the boundary between the display areas of images arranged in close proximity to each other in the two-image display mode.

Note that in the present embodiment, control in the two-image display mode in which two images are displayed side-by-side has been described, but the present invention is not limited thereto, and is also applicable to the cases where images are arranged in various forms. For example, a configuration may be adopted in which an extended area is set in the periphery of an image arranged in a document of a Web page (in the entire periphery of the image in the case where the image is arranged near the center, not in an edge portion of the document), and based on a touch operation inside or outside of this extended area, display control of the present embodiment may be performed on the display object in the Web page. Accordingly, in the display state where the display area of at least one display object (equivalent to an image) that can be enlarged/reduced is present, and the display area of another display object that can be enlarged/reduced is present in the periphery thereof, display control of the present embodiment is applicable. Also, in the present embodiment, the display object is an image, but the display object is not limited thereto, and may be at least any one of a document, an image, a Web page and a map including a document, and the like.

Suitable embodiments of the present invention have been described above. The present invention should not be limited to theses embodiments, and various modifications and changes can be made within the scope of the gist of the present invention.

Note that a single item of hardware may control the system control unit 201, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiments have described an example in which the present invention is applied to a digital camera, the present invention is not limited to this example. The present invention is applicable to, for example, an apparatus capable of display control such as enlargement, reduction and movement of an image in accordance with a touch operation on a touch panel. More specifically, the present invention is applicable to a personal computer, a tablet terminal, which is a kind of a personal computer, a mobile telephone terminal, a smart phone (includes eyeglasses type terminal device and wrist watch type terminal devices), which is a kind of a mobile telephone terminal, a PDA (Personal Digital Assistant), a mobile image viewer, a music player, a game console, an electronic book reader, a business equipment comprising functions such as a printer, a scanner, a facsimile, and/or a copy machine, a medical equipment and the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-002997, filed Jan. 8, 2016 which is hereby incorporated by reference herein in its entirety.

What is claimed is:

1. A display control apparatus comprising:
a touch detector configured to detect a touch operation on a display unit; and
a memory and at least one processor and/or at least one circuit to perform the operations of a display control unit configured to perform:
in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a first touch operation in which a touch operation is performed at a plurality of locations is detected in the extended area, control such that processing in the first display area that is based on the first touch operation is performed, and
in a case where a second touch operation other than a touch operation at a plurality of locations is detected in the extended area, control such that processing in the second display area that is based on the second touch operation is performed,
wherein the first touch operation is a multi-touch operation, and the second touch operation is a single touch operation, and
wherein the first touch operation is an operation of changing a distance between the plurality of touch positions of the first touch operation.

2. The apparatus according to claim 1, wherein the display control unit, in a case where a first touch position from the plurality of touch positions of the first touch operation is detected inside the extended area, performs the processing in the first display area, even in a case where a second touch position is detected outside of the first display area and the extended area.

3. The apparatus according to claim 1, wherein the display control unit, in a case where all of the plurality of touch positions of the first touch operation are detected outside of the first display area and the extended area, does not perform the processing in the first display area.

4. The apparatus according to claim 1, wherein the processing that is based on the first touch operation is processing for enlarging or reducing the first display object and displaying the first display object in the first display area.

5. The apparatus according to claim 1, wherein in a case where a touch operation in the extended area is detected, and the touch operation is a touch operation at one location and is a specific touch operation accompanied by movement of the touch position, the display control unit performs control such that processing in the first display area that is based on the specific touch operation is performed.

6. A display control apparatus comprising:
a touch detector configured to detect a touch operation on a display unit; and
a memory and at least one processor and/or at least one circuit to perform the operations of a display control unit configured to perform:
in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a specific touch operation accompanied by movement of a touch position is detected in the extended area, control such that processing in the first display area that is based on the specific touch operation is performed, and
in a case where a second touch operation not accompanied by movement of a touch position is detected in the extended area, control such that processing in the second display area that is based on the second touch operation is performed,
wherein the display control unit performs control such that area to be processed differs depending on whether the specific touch operation or the second touch operation has been performed on the extended area, out of the first display area and the second display area.

7. The apparatus according to claim 6, wherein the display control unit, in a case where a start of the specific touch operation is detected outside of the first display area and the extended area, does not perform the processing in the first display area.

8. The apparatus according to claim 6, wherein the processing that is based on the specific touch operation is processing for changing a display range of the first display object in the first display area.

9. The apparatus according to claim 6, wherein the specific touch operation is an operation performed by a touch at one location without a plurality of locations being touched.

10. The apparatus according to claim 6, wherein in a case where an entirety of the first display object is displayed in the first display area, the display control unit performs control such that the processing in the first display area is not performed, even if the specific touch operation started in the extended area is detected.

11. The apparatus according to claim 6, wherein the display control unit performs: in a case where a portion of the display object is displayed in the first display area, control such that a display range of the first display object in the first display area is changed according to the specific touch operation started in the first display area or the extended area, and in a case where an entirety of the display object is displayed in the first display area, control such that the display object displayed in the first display area is switched from the first display object to another display object, according to the specific touch operation started in the first display area.

12. The apparatus according to claim 1, wherein the processing that is based on the second touch operation is processing for switching display object set to be processed to the second display object.

13. The apparatus according to claim 1, wherein the second touch operation is an operation of touching and then releasing the touch without moving a touched position.

14. The apparatus according to claim 1, wherein the display control unit performs control such that from a plurality of display areas including the first display area or the second display area, the display area of display object set to be processed is identifiably displayed.

15. The apparatus according to claim 1, wherein the first display object is display object set to be processed.

16. The apparatus according to claim 1, wherein the display control unit, in a case where the first display object is set as display object to be processed, and a touch operation is detected in the first display area, does not perform the processing in the second display area regardless of a type of the touch operation.

17. The apparatus according to claim 1, wherein the display objects are images.

18. The apparatus according to claim 1, wherein the display objects are at least one of documents, Web pages and maps.

19. The apparatus according to claim 1, wherein the display control apparatus is an image capturing apparatus.

20. The apparatus according to claim 1, wherein the display control apparatus is at least one of a mobile phone terminal, a personal computer and a tablet terminal.

21. A control method of a display control apparatus comprising:
  detecting a touch operation on a display unit;
  performing, in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a first touch operation in which a touch operation is performed at a plurality of locations is detected in the extended area, control such that processing in the first display area that is based on the first touch operation is performed; and
  performing, in a case where a second touch operation other than a touch operation at a plurality of locations is detected in the extended area, control such that processing in the second display area that is based on the second touch operation is performed,
  wherein the first touch operation is a multi-touch operation, and the second touch operation is a single touch operation, and
  wherein the first touch operation is an operation of changing a distance between the plurality of touch positions of the first touch operation.

22. A control method of a display control apparatus comprising:
  detecting a touch operation on a display unit;
  performing, in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a specific touch operation accompanied by movement of a touch position is detected in the extended area, control such that processing in the first display area that is based on the specific touch operation is performed; and
  performing, in a case where a second touch operation not accompanied by movement of a touch position is detected in the extended area, control such that processing in the second display area that is based on the second touch operation is performed,
  wherein the display control unit performs control such that area to be processed differs depending on whether the specific touch operation or the second touch operation has been performed on the extended area, out of the first display area and the second display area.

23. A non-transitory computer-readable storage medium storing a program for causing at least one processor to function as a display control unit of a display control apparatus, wherein
  a touch detector detects a touch operation on a display unit; and
  the program causes the at least one processor to function as the display control unit to perform:
  in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a first touch operation in which a touch operation is performed at a plurality of locations is detected in the extended area, control such that processing in the first display area that is based on the first touch operation is performed, and in a case where a second touch operation other than a touch operation at a plurality of locations is detected in the extended area, control such that processing in the second display area that is based on the second touch operation is performed, wherein the first touch operation is a multi-touch operation, and the second touch operation is a single touch operation, and wherein the first touch operation is an operation of changing a distance between the plurality of touch positions of the first touch operation.

24. A non-transitory computer-readable storage medium storing a program for causing at least one processor to function as a display control unit of a display control apparatus, wherein a touch detector detects a touch operation on a display unit; and the program causes the at least one processor to function as the display control unit to perform:

in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a specific touch operation accompanied by movement of a touch position is detected in the extended area, control such that processing in the first display area that is based on the specific touch operation is performed, and in a case where a second touch operation not accompanied by movement of a touch position is detected in the extended area, control such that processing in the second display area that is based on the second touch operation is performed, wherein the display control unit performs control such that area to be processed differs depending on whether the specific touch operation or the second touch operation has been performed on the extended area, out of the first display area and the second display area.

25. A display control apparatus comprising:

a touch detector configured to detect a touch operation on a display unit; and a memory and at least one processor and/or at least one circuit to perform the operations of a display control unit configured to perform:

in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a first touch operation in which a touch operation is performed at a plurality of locations is detected in the extended area, control such that processing in the first display area that is based on the first touch operation is performed, and in a case where a second touch operation other than a touch operation at a plurality of locations is detected in the extended area, control such that processing in the second display area that is based on the second touch operation is performed, wherein the first touch operation is a multi-touch operation, and the second touch operation is a single touch operation, and wherein the display control unit, in a case where a first touch position from the plurality of touch positions of the first touch operation is detected inside the extended area, performs the processing in the first display area, even in a case where a second touch position is detected outside of the first display area and the extended area.

26. A control method of a display control apparatus comprising:

detecting a touch operation on a display unit;

performing, in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a first touch operation in which a touch operation is performed at a plurality of locations is detected in the extended area, control such that processing in the first display area that is based on the first touch operation is performed; and performing, in a case where a second touch operation other than a touch operation at a plurality of locations is detected in the extended area, control such that processing in the second display area that is based on the second touch operation is performed, wherein the first touch operation is a multi-touch operation, and the second touch operation is a single touch operation; and wherein, in a case where a first touch position from the plurality of touch positions of the first touch operation is detected inside the extended area, performing the processing in the first display area, even in a case where a second touch position is detected outside of the first display area and the extended area.

27. A non-transitory computer-readable storage medium storing a program for causing at least one processor to function as a display control unit of a display control apparatus, wherein a touch detector detects a touch operation on a display unit; and the program causes the at least one processor to function as the display control unit to perform:

in a case where, in a state where a plurality of display objects are arranged in close proximity to each other on the display unit, a touch operation on an extended area that is adjacent to a first display area, being a display area of a first display object, and that is provided so as to overlap a portion of a second display area, being a display area of a second display object, is detected, and a first touch operation in which a touch operation is performed at a plurality of locations is detected in the extended area, control such that processing in the first display area that is based on the first touch operation is performed, and in a case where a second touch operation other than a touch operation at a plurality of locations is detected in the extended area, control such that processing in the second display area that is based on the second touch operation is performed, wherein the first touch operation is a multi-touch operation, and the second touch operation is a single touch operation; and wherein, in a case where a first touch position from the plurality of touch positions of the first touch operation is detected inside the extended area, the program further causes the at least one processor to function as the display control unit to perform the processing in the first display area, even in a case where a second touch position is detected outside of the first display area and the extended area.

* * * * *